US012229158B2

(12) United States Patent
Kovachev et al.

(10) Patent No.: US 12,229,158 B2
(45) Date of Patent: *Feb. 18, 2025

(54) DATA TYPE-BASED VISUAL PROFILING OF LARGE-SCALE DATABASE TABLES

(71) Applicant: Treasure Data, Inc., Mountain View, CA (US)

(72) Inventors: Dilyan Kovachev, Bridgeport, CT (US); Pradeep Kumar Reddy Savadi, Sunnyvale, CA (US); Gurbaksh Sharma, Karnal (IN)

(73) Assignee: Treasure Data, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,813

(22) Filed: Nov. 8, 2023

(65) Prior Publication Data

US 2024/0078248 A1 Mar. 7, 2024

Related U.S. Application Data

(63) Continuation of application No. 17/541,494, filed on Dec. 3, 2021, now Pat. No. 11,893,038.

(30) Foreign Application Priority Data

Oct. 21, 2021 (IN) .............................. 202111047901

(51) Int. Cl.
*G06F 16/26* (2019.01)
*G06F 16/242* (2019.01)
(Continued)

(52) U.S. Cl.
CPC .......... *G06F 16/26* (2019.01); *G06F 16/2445* (2019.01); *G06F 16/24522* (2019.01); *G06F 16/24545* (2019.01); *G06F 16/2458* (2019.01)

(58) Field of Classification Search
CPC ............... G06F 16/26; G06F 16/24522; G06F 16/24545; G06F 16/2445; G06F 16/2458;
(Continued)

(56) References Cited

U.S. PATENT DOCUMENTS 10,268,753 B2 * 4/2019 Bar-Or ................ G06F 16/2455
10,387,494 B2 8/2019 Sheffer et al.
(Continued)

FOREIGN PATENT DOCUMENTS

KR 102022875 B1 9/2019

OTHER PUBLICATIONS

Sadayuki Furuhashi, "Automating Workflows for Analytics Pipelines," Open Source Summit Japan 2017, (Jun. 2017); 28 pages.
(Continued)

*Primary Examiner* — Shahid A Alam
(74) *Attorney, Agent, or Firm* — Baker Botts L.L.P.

(57) ABSTRACT

A computer-implemented method can comprise establishing programmatic connections to a digitally stored first database comprising over one million records, each of the records comprising columns; reading a configuration file that specifies tables in the database; for each particular table, forming and submitting a plurality of queries to the database, each of the queries specifying data aggregation operations, and in response thereto, receiving result sets of records of the database; calculating metadata metrics that characterize columns of the records in the result sets and storing the metadata metrics in tables for string column statistics, numeric column statistics, date column statistics, based upon a particular data type among different data types of the columns; generating presentation instructions which when rendered cause displaying one or more graphical visualizations in a graphical user interface.

16 Claims, 9 Drawing Sheets

(51) Int. Cl.
*G06F 16/2452* (2019.01)
*G06F 16/2453* (2019.01)
*G06F 16/2458* (2019.01)

(58) Field of Classification Search
CPC ...... G06F 16/248; G06F 16/25; G06F 16/254; G06F 16/283; G06F 16/288
USPC .......................................................... 707/722
See application file for complete search history.

(56) References Cited

U.S. PATENT DOCUMENTS

| | | | |
|---|---|---|---|
| 11,175,910 B2* | 11/2021 | Gowda | G06F 16/1774 |
| 11,494,362 B2* | 11/2022 | Gerweck | G06F 16/2282 |
| 11,636,124 B1* | 4/2023 | Narayanaswamy | G06F 16/24542 |
| | | | 707/776 |
| 2008/0140696 A1 | 6/2008 | Mathuria | |
| 2009/0077054 A1* | 3/2009 | Muras | G06F 16/24542 |
| | | | 707/999.005 |
| 2011/0191361 A1* | 8/2011 | Gupta | G06F 16/245 |
| | | | 707/769 |
| 2016/0205140 A1* | 7/2016 | Verma | G06F 16/24534 |
| | | | 726/1 |
| 2016/0335318 A1* | 11/2016 | Gerweck | G06F 16/283 |
| 2017/0206256 A1* | 7/2017 | Tsirogiannis | G06F 16/22 |
| 2017/0262769 A1 | 9/2017 | McShane | |
| 2018/0060395 A1 | 3/2018 | Pathak | |
| 2018/0189328 A1 | 7/2018 | Frazier | |
| 2018/0191867 A1* | 7/2018 | Siebel | H04L 67/53 |
| 2018/0196850 A1 | 7/2018 | Schaeffer | |
| 2019/0361891 A1 | 11/2019 | Griffith | |
| 2020/0073987 A1 | 3/2020 | Perumala | |
| 2020/0218721 A1* | 7/2020 | Saini | G06F 16/248 |
| 2020/0372048 A1 | 11/2020 | Carlsson et al. | |

OTHER PUBLICATIONS

Hortonworks, "Using Apache Hive," https://docs.hortonworks.com, Aug. 26, 2019; 45 pages.

Raghav Sethi et al., "Presto: SQL on Everything," 2019 IEEE 35th International Conference on Data Engineering (ICDE), 2019, 12 pages.

* cited by examiner

DATA TYPE-BASED VISUAL PROFILING OF LARGE-SCALE DATABASE TABLES

BENEFIT CLAIM

This application claims the benefit under 35 U.S.C. § 120 as a continuation of application Ser. No. 17/541,494, filed Dec. 3, 2021, which claims the benefit of India application 202111047901, filed Oct. 21, 2021, the entire contents of which are hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever.© 2021 Treasure Data, Inc.

TECHNICAL FIELD

The present disclosure relates to computer-implemented methods of determining metadata metrics that describe tables and columns in large-scale computer databases and graphical user interface methods of generating visualizations of the metadata metrics.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today's large-scale databases can have thousands of tables each with thousands of columns and millions of rows. As databases grow in scale, their complexity rapidly exceeds the human ability to mentally recall attributes, such as size, count, and data type, of tables or columns in the databases. However, knowing the values of certain metrics, such as number of numeric columns or string-based (VARCHAR) columns, can be crucial in resolving database performance problems. Furthermore, determining the data type of particular columns, or counts of columns having a particular data type, has utility; for example, knowing the number of columns that could contain personally identifiable information (PII) could change security controls or risk profiles of tables or databases.

Maintaining records of data schemas and data types is cumbersome with many contemporary tools and the pace of developing databases will often outpace the creation of records that describe data types and other metrics. Exploratory Data Analysis (EDA) refers to manual and computer-implemented methods of descriptive data analytics. Present methods and tools for conducting EDA are time-consuming and difficult to learn. Typical approaches require the use of PYTHON libraries or the PANDAS data analysis module; these usually fail when tables exceed 20,000,000 rows based upon limitations in the image sizes managed in containers and/or due to inefficient data storage and processing within these libraries.

Therefore, an automated method of inspecting a large-scale database to determine metrics concerning columns and tables, and data types of columns, would have valuable utility. Examples of practical applications include selecting features for machine language models and filtering out columns that represent noise or columns that are not statistically significant. Another application is developing profiles that describe the business value, or lack thereof, of maintaining certain kinds of data; the resulting information can inform strategies for defining audience segmentation in advertising technology.

PRESTO is an open source distributed structured query language (SQL) query engine for running interactive analytic queries against data sources of all sizes ranging from gigabytes to petabytes. Presto was designed and written from the ground up for interactive analytics and approaches the speed of commercial data warehouses while scaling to the size of organizations like Facebook. Presto is commercially available at the time of this writing at the domain prestodb.io. APACHE HIVE data warehouse software facilitates reading, writing, and managing large datasets residing in distributed storage using SQL. HIVE is commercially available at the time of this writing at the internet domain hive.apache.org. DIGDAG is an open-source library for data pipeline orchestration and is commercially available from Treasure Data, Inc., Mountain View, California.

SUMMARY

The appended claims may serve as a summary of the invention.

DETAILED DESCRIPTION

Figure 1:
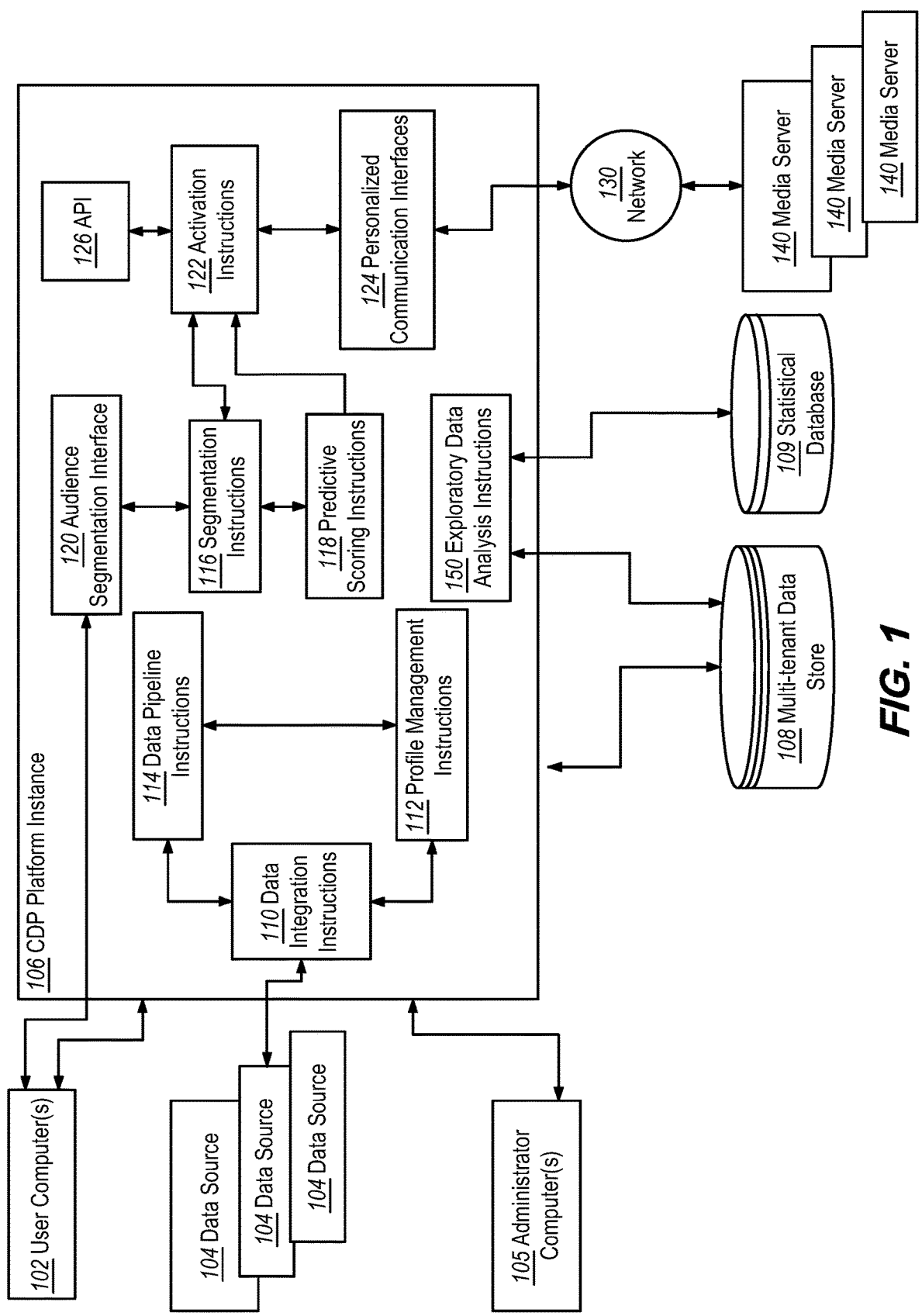
FIG. 1 illustrates a distributed computer system showing the context of use and principal functional elements with which one embodiment could be implemented.

In the following description, for the purposes of explanation, numerous specific details are set forth in order to provide a thorough understanding of the present invention.

It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in the sections below according to the following outline:
1. General Overview
2. Structural & Functional Overview
3. Implementation Example—Hardware Overview 1. General Overview In one embodiment, a computer-implemented method executes rapid exploratory data analysis (EDA) on data tables and columns having arbitrary context and schema. Embodiments can enable data scientists, data engineers, and members of machine language teams to obtain an overview of statistical metrics that describe a dataset; and display information providing a basis to determine which tables or columns have utility in a master segment of an audience and/or which tables or columns contain noise, data needing cleanup, or null values; and provide ML teams with a rapidly accessible view of which tables or columns are useful to set up ML models.

In an embodiment, a computer-implemented method comprises, using a first computer, establishing programmatic connections to a digitally stored first database comprising over one million records, each of the records comprising a plurality of columns; using the first computer, reading a configuration file that specifies a plurality of tables in the first database; using the first computer, for each particular table among the plurality of tables, forming and submitting a plurality of queries to the first database, each of the queries specifying one or more data aggregation operations, and in response thereto, receiving a plurality of result sets of records of the first database; using the first computer, calculating a plurality of metadata metrics that characterize columns of the records in the result sets and storing the metadata metrics respectively in separate tables for string column statistics, numeric column statistics, date column statistics, based upon a particular data type among a plurality of different data types of the columns of the records in the result sets; using the first computer, generating presentation instructions which when rendered using a computer display device cause displaying one or more graphical visualizations in a graphical user interface of the computer display device.

In another embodiment, a computer-implemented method, comprises, using a first computer, establishing programmatic connections to a digitally stored first database comprising over one million records, each of the records comprising a plurality of columns, the first database being part of a HADOOP cluster that is programmatically coupled to a HIVE data warehouse manager and a PRESTO query engine; using the first computer, reading a configuration file that specifies a plurality of tables in the first database; using the first computer, for each particular table among the plurality of tables, forming and submitting a plurality of PRESTO queries to the first database, each of the PRESTO queries specifying one or more data aggregation operations, and in response thereto, receiving a plurality of result sets of records of the first database; using the first computer, calculating a plurality of metadata metrics that characterize columns of the records in the result sets and storing the metadata metrics respectively in separate tables for VARCHAR column statistics, NUMERIC column statistics, DATE column statistics, based upon a particular data type among a plurality of different data types of the columns of the records in the result sets; using the first computer, generating presentation instructions which when rendered using a computer display device cause displaying one or more graphical visualizations in a graphical user interface of the computer display device.

Use of HADOOP, HIVE, and/or PRESTO are not required for all embodiments and are described as examples. Columns may have data types of string, number, time, date, or others, and the labels VARCHAR, NUMERIC, DATE, and TIMESTAMP are used herein only as examples.

In one feature, the method can comprise, using the plurality of metadata metrics that are associated with columns of the records in the result sets having a NUMERIC data type, generating at least one visual histogram that represents a plurality of different counts of a plurality of different numeric values that are represented in the columns. In yet another feature, the method can comprise, using the plurality of metadata metrics that are associated with columns of the records in the result sets having a NUMERIC data type, calculating and storing a numerical correlation matrix in which cells of the matrix contain numeric values specifying magnitudes of correlation of values in pairs of the columns. In still another feature, the method can comprise the presentation instructions being programmed, when rendered using the computer display device, to cause displaying, in the one or more graphical visualizations in the graphical user interface of the computer display device, a plurality of circle widgets, each of the circle widgets being associated with a particular data type among the plurality of data types of the columns of the records in the result sets, each of the circle widgets comprising at least two arc segments, one of the arc segments having an arcuate length that represents a proportion of a count of columns having the particular data type among all columns in the records.

In a further feature, the method can comprise: the plurality of metadata metrics that characterize columns of the records in the result sets in a particular table for VARCHAR column statistics comprising two or more of a count of rows with the VARCHAR data type; a count of rows having NULL values; a percentage of all rows having NULL values; a count of distinct values in rows; a percentage of rows that have distinct values; the presentation instructions being programmed, when rendered using the computer display device, to cause displaying, in the one or more graphical visualizations in the graphical user interface of the computer display device, a circle widget comprising a plurality of arc segments each having an arcuate length that is proportional to a number of columns that store categorical, timestamp, PII, or numeric data in the rows with the VARCHAR data type.

In one aspect of this feature, the method can comprise, the presentation instructions being programmed, when rendered using the computer display device, to cause displaying, in the one or more graphical visualizations in the graphical user interface of the computer display device, a table specifying, for a plurality of named columns, two or more of: the count of rows with the VARCHAR data type; the count of rows having NULL values; the percentage of all rows having NULL values; the count of distinct values in rows; the percentage of rows that have distinct values.

In another aspect, the method can comprises the presentation instructions being programmed, when rendered using the computer display device, to cause displaying, in the one or more graphical visualizations in the graphical user interface of the computer display device, a bar graph specifying, for a plurality of named columns, top N counts of categorical values in the named columns, each of the bars comprising a bar segment having a visually distinctive representation for each of the counts, N being in the range of 2 to 20. In yet another feature, the plurality of metadata metrics that characterize columns of the records in the result sets in a particular table for NUMERIC column statistics can comprise two or more of: a count of rows with the NUMERIC data type; a count of rows having NULL values; a percentage of all rows having NULL values; a count of distinct values in rows; a percentage of rows that have distinct values; minimum values represented in the rows; maximum values represented in the rows; standard deviations of values in the rows; skew of values in the rows; the presentation instructions being programmed, when rendered using the computer display device, to cause displaying, in the one or more graphical visualizations in the graphical user interface of the computer display device, a circle widget comprising a plurality of arc segments each having a radial length that is proportional to a number of columns that store categorical, timestamp, PII, or numeric data in the rows with the NUMERIC data type.

In still another feature, the presentation instructions can be programmed, when rendered using the computer display device, to cause displaying, in the one or more graphical visualizations in the graphical user interface of the computer display device, a table specifying, for a plurality of named columns, two or more of: two or more of: a count of rows with the NUMERIC data type; a count of rows having NULL values; a percentage of all rows having NULL values; a count of distinct values in rows; a percentage of rows that have distinct values; minimum values represented in the rows; maximum values represented in the rows; standard deviations of values in the rows; skew of values in the rows. The presentation instructions can be programmed, when rendered using the computer display device, to cause displaying, in the one or more graphical visualizations in the graphical user interface of the computer display device, a first box plot comprising a first plurality of box items corresponding to the columns and representing ranges of NUMERIC values of the columns, and a second box plot comprising a second plurality of box items corresponding to the columns and representing ranges of Boolean values of selected the columns that store Boolean data. The presentation instructions can be programmed, when rendered using the computer display device, to cause displaying, in the one or more graphical visualizations in the graphical user interface of the computer display device, a bar chart specifying columns having null or non-null missing values in the rows.

In a further feature, the presentation instructions can be programmed, when rendered using the computer display device, to cause displaying, in the one or more graphical visualizations in the graphical user interface of the computer display device, a correlation circle widget for a first particular column, the correlation circle widget comprising a plurality of graphical arms that are spaced apart circumferentially around the circle and correspond to labels of columns, each of the arms having a radial length that is proportional to a magnitude of correlation of values for the associated column to values of the first particular column.

In one feature, the presentation instructions can be programmed, when rendered using the computer display device, to cause displaying, in the one or more graphical visualizations in the graphical user interface of the computer display device, a correlation plot for a first particular column, the correlation plot comprising an ordered plurality of graphical bars, each of the bars corresponding to one of the columns, each of the bars having a height that is proportional to a magnitude of correlation of values for the associated column to values of the first particular column.

In a further feature, the method can comprise: the plurality of metadata metrics that characterize columns of the records in the result sets in a particular table for TIMESTAMP column statistics comprising two or more of: a type of data representation in which the columns store TIMESTAMP data; a start date; an end date; a time range; a count of rows having NULL values; a percentage of all rows having NULL values; a count of distinct values in rows; the presentation instructions being programmed, when rendered using the computer display device, to cause displaying, in the one or more graphical visualizations in the graphical user interface of the computer display device, a bar chart specifying, for a plurality of the columns, the types of data representations in which the columns store TIMESTAMP data.

In yet another feature, the method can comprise: the presentation instructions being programmed, when rendered using the computer display device, to cause displaying, in the one or more graphical visualizations in the graphical user interface of the computer display device, a line graph that graphs the magnitude of days with most activity represented in the columns having TIMESTAMP data.

The foregoing embodiments, features, and aspects are examples of the subject matter of the disclosure and other embodiments, features, and aspects will be apparent from other sections of the disclosure.

2. Structural & Functional Overview

FIG. 1 illustrates a distributed computer system showing the context of use and principal functional elements with which one embodiment could be implemented.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a plurality of user computers 102, data sources 104, administrator computers 105, multi-tenant data store 108, statistical database 109, and network 130 are communicatively coupled to a customer data platform (CDP) instance 106. Each of the user computers 102 and administrator computers 105 comprises any of a desktop computer, laptop computer, tablet computer, smartphone, or other computing device and may be coupled directly or indirectly via one or more network links. User computers 102 can be associated with end users who interact with programs of CDP instance 106 to generate metadata for database tables and/or generate or view visualizations of the metadata in the manner described in other sections. Administrator computers 105 can be associated with other end users who are responsible to configure, manage, or administer the CDP instance 106.

Each of the data sources 104 can be a networked, digitally stored data repository of records of transactions, communications, impressions, or other data concerning an interaction of an enterprise with customers of the enterprise. The data sources 104 are conceptually external to the CDP instance 106 and can be associated with an enterprise that has a customer relationship with thousands to millions of customers. Examples include retailers or distributors of goods, service providers, or consolidators. In one example, a data source 104 can hold records concerning sales of goods of an enterprise and customers such as orders, shipping data, metadata relating to how customers located or interacted with the enterprise, media placement data, and other commercial records.

In an embodiment, the multi-tenant data store 108 is a large-scale data repository that stores records that the CDP instance 106 manages and uses to conduct operations, for multiple different enterprises that have a customer relationship with the owner or operator of the CDP instance 106. Thus, the CDP instance 106 can provide services to a large number of different enterprises, and all data created by the CDP platform for all enterprises can be centrally stored in multi-tenant data store 108, under the control of security algorithms that block or prevent user computers 102 of one enterprise from accessing, using, or viewing the data of a different enterprise. In one implementation, data store 108 can be an APACHE HADOOP cluster of repositories or databases.

In an embodiment, the statistical database 109 is a digital data repository that is programmed to store tables of metadata concerning the data sources 104, and data to support visualization operations, that the CDP instance 106 generates in the manner further described in other sections herein. Broadly, as further described in other sections, the CDP instance 106 is programmed to read data sources 104, generate metadata describing the data in the data sources, store the metadata in statistical database 109, and generate and cause displaying a plurality of different visual representations of the metadata on computer display devices with graphical user interfaces. In some embodiments, the statistical database 109 can be integrated with multi-tenant data store 108.

In an embodiment, the network 130 can be one or more local area networks, wide area networks, or internetworks, using any of wired or wireless, terrestrial or satellite data links. In an embodiment, the media servers 140 comprise networked computers that can be called or instructed, from CDP instance 106, to cause dispatching communications to user computers 102 or other entities in the manner described in other sections herein.

In an embodiment, the CDP instance 106 comprises sequences of executable stored program instructions that are organized in the functional units, packages, and elements shown in FIG. 1 and executed or hosted using one or more virtual computing instances in a private datacenter, public datacenter, and/or cloud computing facilities. In an embodiment, the CDP instance 106 can include: data integration instructions 110, which are coupled to data sources 104 as inputs and also coupled to data pipeline instructions 114 and profile management instructions 112, the data pipeline instructions and profile management instructions being programmed to interoperate; segmentation instructions 116 coupled to the data pipeline instructions 114, to predictive scoring instructions 118, and an audience segmentation interface; activation instructions 122, which are coupled to segmentation instructions 116 and predictive scoring instructions 118 as well as to personalized communication interfaces 124 and an application programming interface (API) 126. Segmentation instructions 116 are coupled to an audience segmentation interface 120 that is programmed to interact with user computers 102 to define audience segments and advertising or marketing campaigns. While certain embodiments can be used in advertising technology applications, the techniques described and claimed herein are not limited to that context and are not intended to perform business functions.

The foregoing elements are programmed, broadly, to obtain data from the data sources 104; process the data via data integration instructions 110, for example to normalize and/or clean the data for storage in multi-tenant data store 108; to further process the data via data pipeline instructions 114 according to a programmed workflow or pipeline of steps under direction of the profile management instructions 112; to use segmentation instructions 116 and audience segment definitions received from audience segmentation interface 120, along with to predictive scoring instructions 118, to establish audience segments and campaigns for the purpose of transmitting communications to audiences of customers or other users; to communicate the segments and campaigns to activation instructions 122, which are programmed to activate campaigns on a plurality of different communication channels such as email, text messaging, or automatic calls; and to dispatch individual communications of a campaign via personalized communication interfaces 124 toward media servers 140 for communication to customers or users. Activations also can be initiated via calls to the API 126 from external systems.

The foregoing is a generalized and broad description of the operations of CDP instance 106, in one embodiment. A complete description of all possible operations and uses of CDP instance 106 is beyond the scope of this disclosure and would obscure the focus of this disclosure. An example of a CDP instance 106 is the TREASURE DATA platform commercially available from Treasure Data, Inc. and Treasure Data K. K., which is fully described and documented at the time of this writing in publications available at the domain "treasuredata" in the COM global top-level domain of the World Wide Web. Those using this disclosure are presumed to have familiarity with programming, architecting, and implementing CDP platforms of the type described on the preceding publications. The ability to create a working implementation based on this disclosure may also involve having knowledge and skill with PRESTO, HIVE, DIGDAG from Treasure Data, and TREASURE INSIGHTS from Treasure Data.

The CDP instance 106 of FIG. 1 further comprises exploratory data analysis (EDA) instructions 150 which are programmed, in general, to obtain data from multi-tenant data store 108 for tables and columns represented in the data store that were created and stored based on the data sources 104, to generate metadata describing the tables and columns via aggregation algorithms and statistical algorithms, and to generate presentation instructions that are programmed to cause displaying graphical visualizations of the metadata on computer display devices having graphical user interfaces. In an embodiment, EDA instructions 150 are coupled to statistical database 109 to store metadata describing the tables and columns of multi-tenant data store 108.

EDA instructions 150 can be programmed to solve the problems described in the Background of this disclosure. In an embodiment, EDA instructions 150 are programmed to use PRESTO and HIVE functions and operations that can loop through a list of database tables in multi-tenant data store 108 and extract or calculate statistical values from each table and column, using aggregation in some cases, potentially reducing tables of 100,000,000 rows or more into far smaller tables, which can be as small as thousands of rows depending on the tables and columns that the user computer 102 requests to explore, of condensed descriptive statistics. The resulting smaller tables can be stored in statistical database 109 and used in an in-memory data model that powers a visual dashboard and other graphical visualizations. As later sections will show, EDA instructions 150 can be programmed to generate graphical visualizations and interface elements that can be used with user computers 102 associated with non-technical users. Execution of EDA instructions 150 can be controlled by a configuration file that specifies data to inspect, the minimum requirements of data to trigger an output or find PII and aggregate or find columns that are in the wrong format. EDA instructions 150 can be programmed with filters to exclude data from tables or columns in the computation of metadata.

Figure 2:
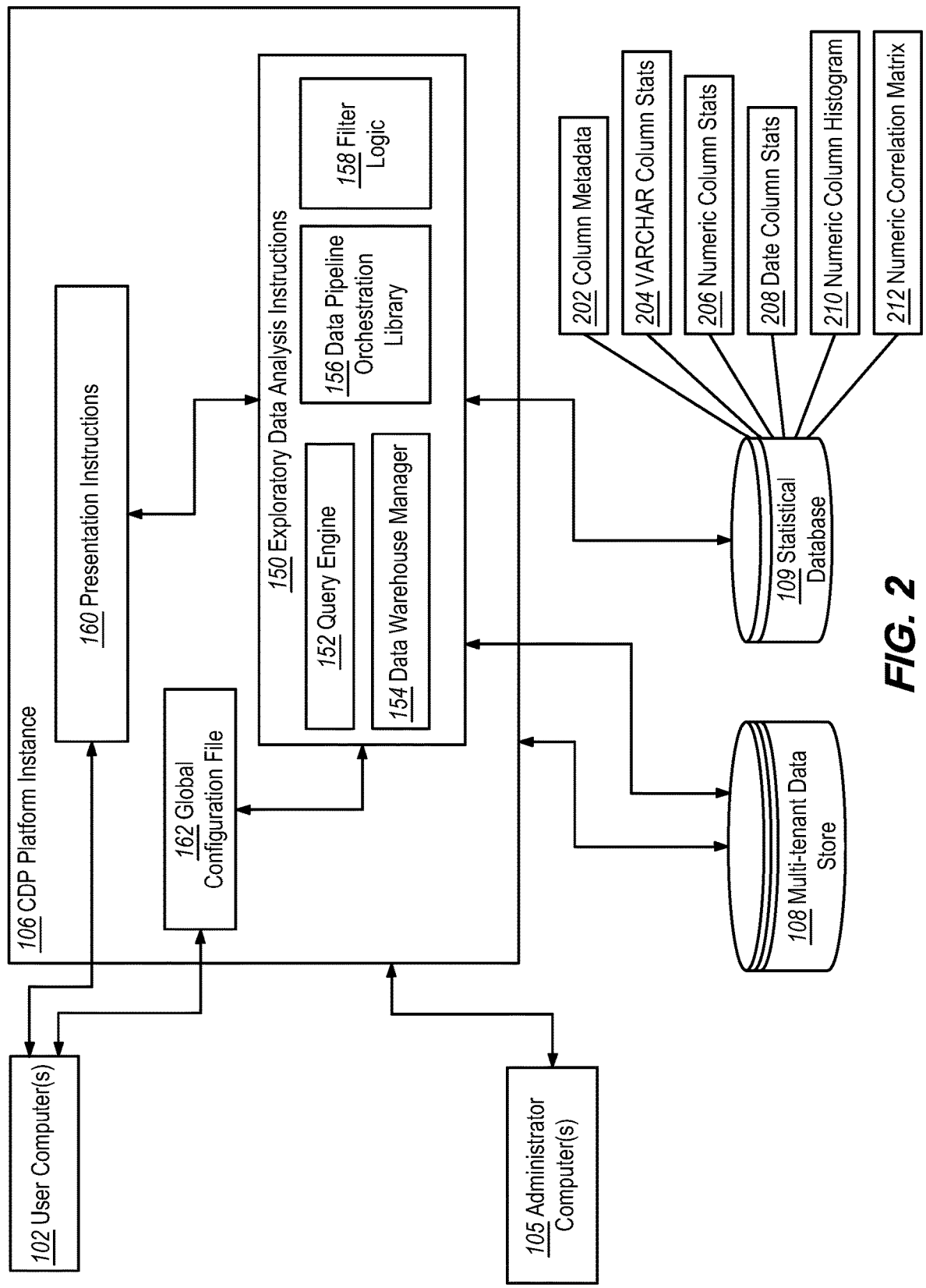
FIG. 2 illustrates the system of FIG. 1 with a focus on exploratory data analysis instructions and database tables of one implementation.

FIG. 2 illustrates the system of FIG. 1 with focus on exploratory data analysis instructions and database tables of one implementation. In an embodiment, EDA instructions 150 comprise a query engine 152, data warehouse manager 154, data pipeline orchestration library 156, and filter logic 158. In one implementation, the query engine 152 can be the PRESTO query engine; the data warehouse manager 154 can be the APACHE HIVE data warehouse system; and the data pipeline orchestration library 156 can be DIGDAG from Treasure Data. APACHE HIVE is a data warehouse system that uses APACHE HADOOP data repositories and that facilitates data summarization, ad-hoc queries, and the analysis of large datasets stored in various databases and file systems that integrate with HADOOP. HIVE can apply structure to large amounts of unstructured data and then perform batch SQL-like queries on that data. A "query," as used in other sections herein, can be a HIVE job that includes one or more SELECT or data manipulation language (DML) queries using the HIVE query language (HIVEQL), which can be processed using query engine 152 via PRESTO and executed using the HADOOP MapReduce framework. The standard Hive 0.13 HiveQL and Hive 2.x ANSI SQL are documented together at the time of this writing in the sub domain "hive" of the domain "apache.org" on the internet. PRESTO is an open source distributed SQL query engine for running interactive analytic queries against data sources of all sizes ranging from gigabytes to petabytes which is documented at the time of this writing at the domain "prestodb.io" on the internet.

The filter logic 158 can be coded in C++, C, JAVA, or a similar source programming language to receive input specifying one or a plurality of data type flags and PII detection flags, and to remove non-matching rows from visualizations of the EDA dashboard as further described herein. For example, filter logic 158 can be programmed to generate one or more graphical user interface (GUI) panels, each associated with a particular filter type, arranged in a hierarchical or cascading chain of filters that allow selecting particular data types or other values to include or not include.

In an embodiment, EDA instructions 150 can be coupled to a configuration file 162 that is programmed with instructions to control the operation of the EDA instructions. In an embodiment, EDA instructions 150 can be coupled to presentation instructions 160, which are programmed to generate dynamic HTML or other forms of presentation instructions which, when rendered or executed at a computer having a display device having a graphical user interface, cause displaying graphical visualizations of the metadata on the computer display device.

In one embodiment, the configuration file 162 comprises a plurality of instructions and parameters that control a flow of execution of the EDA instructions 150. For example, in one implementation, a config/global.yml file expressed in Yet Another Markup Language (YAML) is created and stored in a project folder and contains parameters and commands. The EDA instructions 150, or an element such as instructions of the data pipeline orchestration library 156, are programmed to read the configuration file, parse each configuration line, and control execution of the EDA instructions as specified in the configuration file. Example configuration parameters may include:

cleanup_temp_tables: YES—when set to YES, temporary tables are deleted when a workflow execution completes.

get_db_table_list: YES—when set to YES, the EDA instructions scan an INFORMATION SCHEMA and return a list of all table names in the selected database.

table_list: following the syntax set forth in TABLE 1 below, the configuration file comprises a list of table_name, database, columns to exclude from calculations, and name of the true timestamp column. These are the tables that the workflow loops through to execute EDA and output final column statistics.

TABLE 1

SYNTAX FOR TABLE_LIST IN CONFIG FILE

```
table_list:
 - name : mta_metrics_transpose
   db : user_demo
   exclude_cols: 'time'
   date_col: 'time'
 - name : ml_eda_attributes
   db: user_demo
   exclude_cols: 'time'
   date_col: 'time'
``` include_dbs_tbs: WHERE REGEXP_LIKE (table_schema, 'userid')—regular expression to extract a list of table names from database names that match the regular expression (REGEX) syntax.

metadata_table: eda_tables_column_metadata—name of the final metadata table that contains a column schema and data types of reach table from the table_list.

head_sample: "5" as an example; identifies the number of data samples to include in the column_sample field of the data summary table.

top_k_vals: "10" as an example; determines how many of the top k distinct value counts will be aggregated for each VARCHAR column.

min_rows: "5" as an example; determines the minimum number of non-null rows that must be present for a column to be the subject of further calculations of metrics.

exclude_pii: ##AND pii_flag='Non-PII'—if the value is uncommented, it will add an AND clause to a query that executes aggregations for VARCHAR columns, to exclude columns with PII data.

data_threshold: "0.25" as an example; used as a minimum percentage of the total data that is required to match a regular expression when executing PII detection and other data detection code.

sample_size: "20" as an example; determines what percent of the total data over which to execute a TABLESAMPLE BERNOULLI before running the data detection code.

num_bins: "50" as an example; determines the number of "bins" to use in aggregating numerical data for histogram and kernel density estimation (KDE) plots.

top_k_days_by_event_cnt: "30" as an example; determines the top-k days to aggregate by event count.

date_range_format: 'day' for example; determines if a column having a data type of "datetime" will be aggregated by day, month, or year.

In an embodiment, EDA instructions 150 can be programmed to output statistical metrics, which have been calculated as described above and in other sections herein under the control of the configuration file 162 and store the statistical metrics in tables in statistical database 109. In an embodiment, execution of EDA instructions 150 results in creating and storing, in statistical database 109, column metadata 202, column statistics 204 for columns of the data type VARCHAR or string, column statistics 206 for columns of the data type NUMERIC, column statistics 208 for columns of the data type TIMESTAMP or DATE, a histogram 210 pertaining to the columns of the data type NUMERIC, and a correlation matrix 212 pertaining to the columns of the data type NUMERIC. In one embodiment, table outputs to statistical database 109 include:

eda_tables_column_metadata—a metadata table that contains all data type flags and PII detection flags, which can be used as global filters in the EDA dashboard as further described.

eda_varchar_column_stats—a table with a list of all column names having a data type of VARCHAR, values for data types of those columns and values for multiple statistical metrics based on reading data of those columns.

eda_mumerical_column_stats—a table with a list of all column names having a data type of NUMERIC (double or bigint), values for data types of those columns and values for multiple statistical metrics based on reading data of those columns.

eda_date_column_stats—a table with a list of all column names having a data type of TIMESTAMP, including for example "datetime", "date", "unixtime" or "ISO" data types, values for data types of those columns and values for multiple statistical metrics based on reading data of those columns.

eda_numerical_column_histogram—a table with "binned" data statistics for use in generating KDE and box plot widgets in the EDA dashboard or other visualizations.

eda_num_corr_matrix—a table with correlation values for each column pair in the NUMERIC column list of each table.

Figure 3:
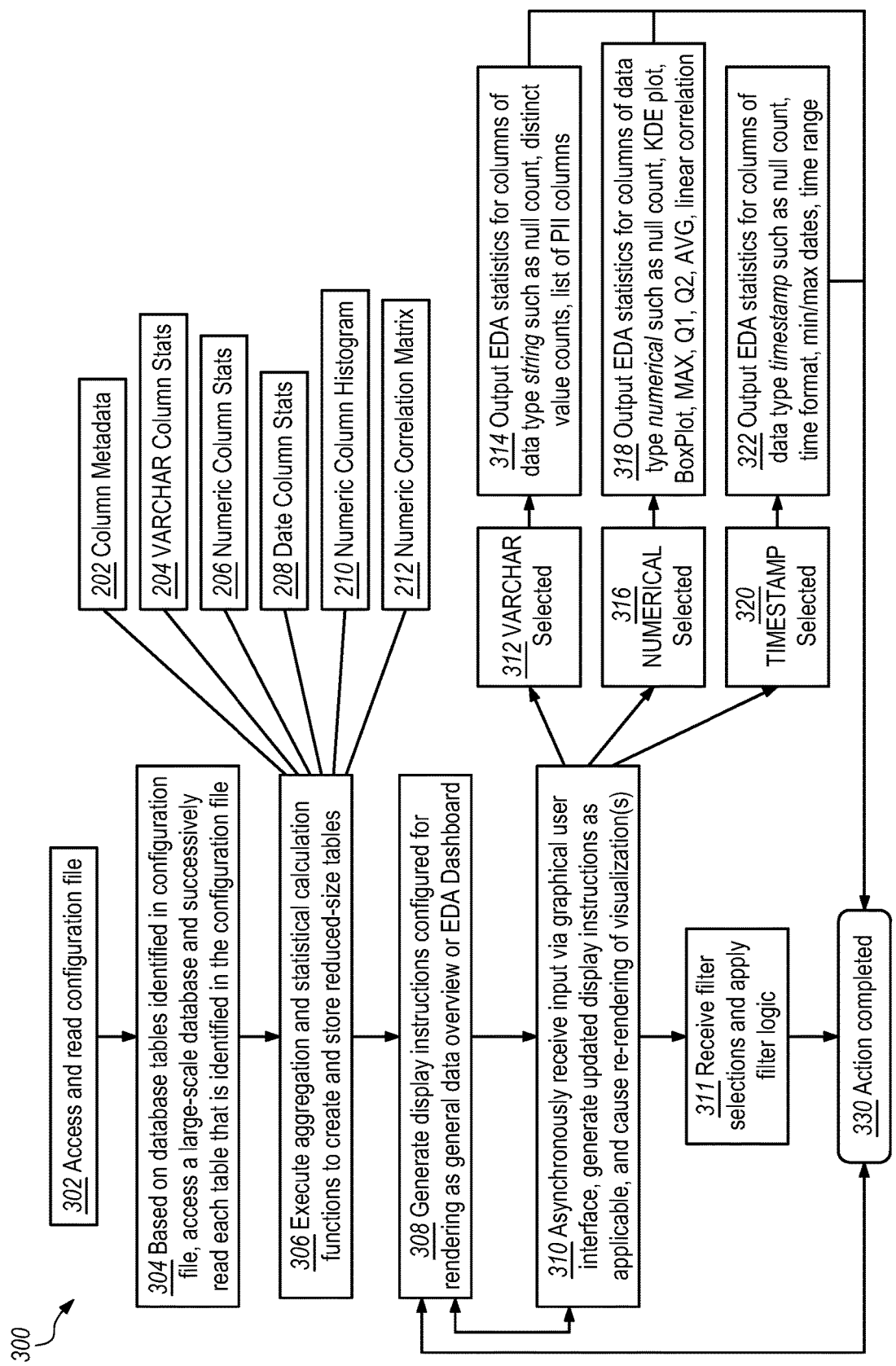
FIG. 3 illustrates an example computer-implemented process or algorithm for generating metadata for database tables useful in exploratory data analysis.

FIG. 3 illustrates an example computer-implemented process or algorithm for generating metadata for database tables useful in exploratory data analysis. FIG. 3 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In the example of FIG. 3, a computer-implemented process 300 initiates execution at block 302 in which the process is programmed to access and read a configuration file. For example, the EDA instructions 150 are programmed to read configuration file 162, parse its instructions, create in-memory variables or constants as specified in the file, and store control data to control further execution of the process.

At block 304, the process is programmed, based on database tables that are identified in the configuration file, access a large-scale database, and successively read each table that is identified in the configuration file. For example, the EDA instructions 150 are programmed to read configuration file 162, identify a list of databases, tables, and/or columns, and iteratively access and read the specified databases, tables, and/or columns.

At block 306, the process is programmed to execute aggregation and statistical calculation functions to create and store reduced-size tables. In one embodiment, execution of block 306 can comprise calling PRESTO and HIVE functions to execute aggregation on the databases, tables, and/or columns that were identified at block 304, while concurrently calculating aggregated statistical metadata relating to the databases, tables, and/or columns. In an embodiment, execution of block 306 results in creating and storing, in statistical database 109, column metadata 202, column statistics 204 for columns of the data type VARCHAR or string, column statistics 206 for columns of the data type NUMERIC, column statistics 208 for columns of the data type TIMESTAMP or DATE, a histogram 210 pertaining to the columns of the data type NUMERIC, and a correlation matrix 212 pertaining to the columns of the data type NUMERIC.

As one implementation example for block 306, TABLE 2 shows a parameterized query that is programmed to read a list of tables and column names from a YAML configuration file, extract all numeric columns, and obtain statistical values for later display in an EDA dashboard including min, max, AVG, Standard Deviation, percentiles, outliers, nulls, and skewness.

TABLE 2

PARAMETERIZED QUERY EXAMPLE

```
WITH T1 AS (
select
'${table.db}.${table.name}' as table_name,
'${col_name}' as column_name,
count(*) as total_rows,
count_if(${col_name} IS NULL) as null_cnt,
max(${col_name}) as max_value,
min(${col_name}) as min_value,
ROUND(avg(${col_name}), 3) as average_value,
ROUND(STDDEV(${col_name}), 3) as std_dev,
ROUND(variance(${col_name}), 3) as var,
approx_percentile(${col_name}, 0.25) as "q1",
approx_percentile(${col_name}, 0.50) as "q2",
approx_percentile(${col_name}, 0.75) as "q3",
ROUND(approx_percentile(${col_name}, 0.75) + (approx_percentile(${col_name},
0.75) - approx_percentile(${col_name}, 0.25))*1.5, 3) as outl_upper_rng,
ROUND(approx_percentile(${col_name}, 0.25) - (approx_percentile(${col_name},
0.75) - approx_percentile(${col_name}, 0.25))*1.5, 3) as outl_lower_rng,
ROUND(approx_percentile(${col_name}, 0.75) - approx_percentile(${col_name},
0.25), 3) as iqr,
ROUND(KURTOSIS(${col_name}), 3) as kurtosis_val,
ROUND(skewness(${col_name}), 3) as skewness_val
from ${table.db}.${table.name}
),
T2 AS (
SELECT
'${col_name}' as column_name,
array_sort(array_agg(${col_name})) as outlier_list,
count(*) as num_outliers
FROM ${table.db}.${table.name}
WHERE ${col_name} > (SELECT outl_upper_rng FROM T1)
OR ${col_name} < (SELECT outl_lower_rng FROM T1)
group by 1
)
SELECT T1.*, T2.num_outliers, T2.outlier_list
FROM T1 LEFT JOIN T2
ON T1.column_name = T2.column_name
```

TABLE 3 presents a version of the query of TABLE 2 in a clean form in which the configuration file has been processed to substitute values for the parameters of the query of TABLE 2 and thus dynamically generate a compete executable query.

TABLE 3

CLEAN QUERY EXAMPLE
("CLTV" refers to "customer lifetime value" in the domain of
CDP systems; other embodiments could use other values or labels)

```
INSERT INTO "eda_numerical_column_stats"
WITH T1 AS (
select
'ml_dev.tb_attributes_mock_test' as table_name,
'cltv' as column_name,
count(*) as total_rows,
count_if(cltv IS NULL) as null_cnt,
CAST(count_if(cltv IS NULL) as double) / count(*) as null_perc,
max(CAST(cltv as DOUBLE)) as max_value,
min(CAST(cltv as DOUBLE)) as min_value,
ROUND(avg(CAST(cltv as DOUBLE)), 3) as average_value,
ROUND(STDDEV(CAST(cltv as DOUBLE)), 3) as std_dev,
ROUND(variance(CAST(cltv as DOUBLE)), 3) as var,
approx_percentile(CAST(cltv as DOUBLE), 0.25) as "q1",
approx_percentile(CAST(cltv as DOUBLE), 0.50) as "q2",
approx_percentile(CAST(cltv as DOUBLE), 0.75) as "q3",
ROUND(approx_percentile(CAST(cltv as DOUBLE), 0.75) +
(approx_percentile(CAST(cltv as DOUBLE), 0.75) - approx_percentile(CAST(cltv
as DOUBLE), 0.25))*1.5, 3) as outl_upper_rng,
ROUND(approx_percentile(CAST(cltv as DOUBLE), 0.25) -
(approx_percentile(CAST(cltv as DOUBLE), 0.75) - approx_percentile(CAST(cltv
as DOUBLE), 0.25))*1.5, 3) as outl_lower_rng,
ROUND(approx_percentile(CAST(cltv as DOUBLE), 0.75) -
approx_percentile(CAST(cltv as DOUBLE), 0.25), 3) as iqr,
ROUND(KURTOSIS(CAST(cltv as DOUBLE)), 3) as kurtosis_val,
```

TABLE 3-continued

CLEAN QUERY EXAMPLE
("CLTV" refers to "customer lifetime value" in the domain of CDP systems; other embodiments could use other values or labels)

```
ROUND(skewness(CAST(cltv as DOUBLE)), 3) as skewness_val
from ml_dev.tb_attributes_mock_test
),
T2 AS (
SELECT
'cltv' as column_name,
array_sort(array_agg(CAST(cltv as DOUBLE))) as outlier_list,
count(*) as num_outliers
FROM ml_dev.tb_attributes_mock_test
WHERE CAST(cltv as DOUBLE) > (SELECT outl_upper_rng FROM T1)
OR CAST(cltv as DOUBLE) < (SELECT outl_lower_rng FROM T1)
group by 1
)
SELECT T1.*, T2.num_outliers, T2.outlier_list
FROM T1 LEFT JOIN T2
ON T1.column_name = T2.column_name
```

TABLE 4 presents a query to generate statistical values for VARCHAR or string columns using aggregation, such as distinct value counts and null value counts.

TABLE 4

STRING COLUMN QUERY EXAMPLE

```
INSERT INTO "eda_varchar_column_stats"
WITH T1 as (
select
'ml_dev.rfm_mock_data' as table_name,
'country' as column_name,
count(*) as total_rows,
count_if(country IS NULL) as null_cnt,
ROUND(CAST(count_if(country IS NULL) AS DOUBLE) / count(*), 3) as null_perc,
APPROX_DISTINCT(country) as distinct_vals
from ml_dev.rfm_mock_data
GROUP BY 1, 2
HAVING count(*) > 5
),
```

TABLE 5 presents a query to generate value counts for each unique value in a column for the top_k values by count controlled by the top_k_vals parameter in the configuration file, and JOINS to T1 on table_name.

TABLE 5

STRING COLUMN QUERY EXAMPLE

```
T2 as (
SELECT * FROM (
select
'ml_dev.rfm_mock_data' as table_name,
'country' as column_name,
country as col_value,
count(*) as value_counts
FROM ml_dev.rfm_mock_data
GROUP BY 1, 2, 3
order by value_counts desc
limit 10
)
)
Select T1.*, T2.col_value, T2.value_counts
FROM T1 JOIN T2
ON T1.table_name = T2.table_name
```

Figure 4:
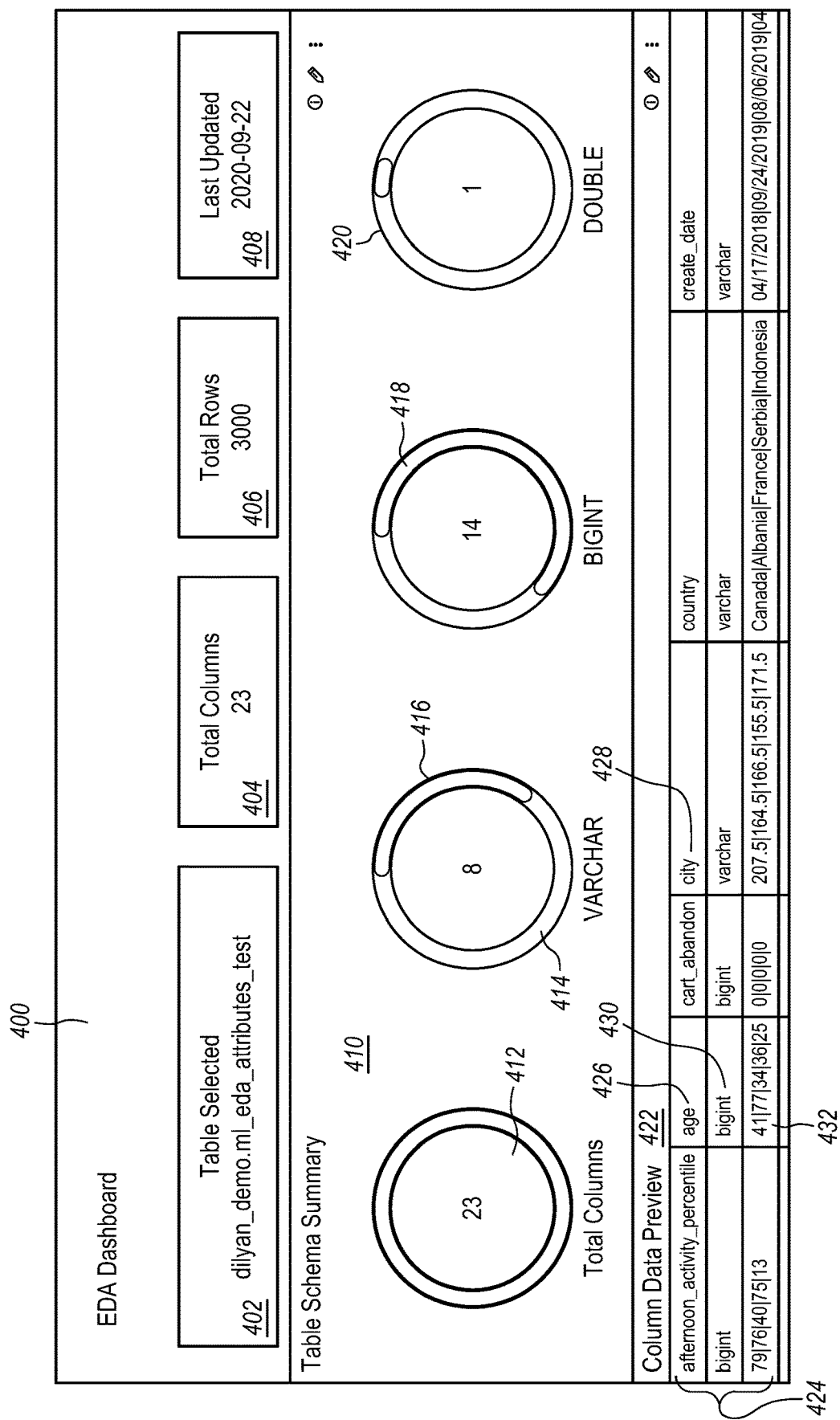
FIG. 4 illustrates an example computer display device with a graphical user interface showing an EDA dashboard.

At block 308, the process is programmed to generate display instructions that are configured for rendering, in a display device that supports a graphical user interface, a general data overview or EDA dashboard. FIG. 4 illustrates an example computer display device with a graphical user interface showing an EDA dashboard. For one example embodiment, FIG. 4 shows a computer display device 401 that has rendered and displayed a graphical user interface (GUI) 400 arranged as an EDA data overview or dashboard. In an embodiment, the EDA dashboard reads from an insights model that is built from the workflow output tables that have been previously described in connection with FIG. 2. Tables in the data model are joined to the eda_tables_column_metdata on table_name and column_name, so that the main metadata table columns can serve as global filters. In an embodiment, GUI 400 comprises a selected table panel 402, total columns panel 404, total rows panel 406, date panel 408, and schema summary panel 410. EDA instructions 150 are programmed to establish the form of all elements in GUI 400 and the substantive values that are displayed in the panels, widgets, tables, and other visual or graphical elements of FIG. 4.

The selected table panel 402 identifies the name of a particular table that the EDA instructions 150 have read and from which the other values in GUI 400 have been calculated. In an embodiment, EDA instructions 150 can be programmed to display the total columns panel 404 with a total number of columns that exist in the table identified in selected table panel 402; in the example of FIG. 4, that table has "23" columns but a practical embodiment could read and calculate metadata for tables having any number of columns up to millions. In an embodiment, EDA instructions 150 can be programmed to display total rows panel 406 with a total number of rows in the table specified in selected table panel 402; in the example of FIG. 4, that table has "3000" total rows, but a practical embodiment could read and calculate metadata for any number of rows up to hundreds of millions of rows. The EDA instructions 150 can be programmed to display the date panel 408 with a date value specifying the last date on which the EDA instructions executed metadata calculations for the table identified in selected table panel 402, and the date value can be retrieved from the statistical database 109, from a date table having the selected table name of panel 402 as a key value.

The EDA instructions 150 can be programmed to generate instructions to display the schema summary panel 410 with four (4) circle widgets 412, 414, 418, 420. In an embodiment, a total columns widget of the circle widgets 412 visually represents the total columns value ("23" in this example) of the total columns panel 404. The other circle widgets 414, 418, 420 each visually represents a count of columns in the table of selected table panel 402 having a particular data type. To generate counts of columns that are shown in the circle widgets 414, 418, 420, EDA instructions 150 can be programmed to read each column of the table specified in selected table panel 402 and read a data type value that was stored in table metadata of the table at the time that it was created or edited.

In an embodiment, each of the other circle widgets 414, 418, 420 comprises a graphical circle having a column count value within the circle ("8", "14", "1" in the example of FIG. 4), and having an arc segment 416 that is visually rendered in a color or other format that is visually different from the remainder of the circle widget. The size or arcuate length of each arc segment 416 is proportional to the quantity shown within the circle, divided by the total columns value of the total columns widget. For example, for circle widget 414, the arcuate length of arc segment 416 is equal to "8" divided by "23" or about ⅓ of the total circumference of the circle widget 414. Similarly, circle widgets 418, 420 have segments having different arcuate lengths that are proportional to the total based on the specific values within the widgets. Although FIG. 4 shows the arc segments in a distinct color compared to the rest of the circle widgets, in other embodiments, the arc segments may be displayed using the same color with shading, less or greater chroma value, or other forms of different visual representation.

In an embodiment, column data preview panel 422 presents an excerpt of the data in columns of the table shown in selected table panel 402. In the example of FIG. 4, column data preview panel 422 comprises a data region 424 comprising a plurality of column names 426, 428, data type identifiers 430, and data values 432. The column names 426, 428 may be truncated within the column data preview panel 422 when the table named in selected table panel 402 has too many columns to fit within the then-current visual window size of the display device; in such a case, the column names may be programmed as a scrollable list that can be moved leftward or rightward in response to input in the GUI. Each of the column names 426, 428 corresponds to a specific one of the data type identifiers 430, which names the data type of the specified column. In an embodiment, data values 432 shows a portion of all data values in the associated column. The example of FIG. 4 shows four to five data values 432 for each corresponding column name 426, 428, but in other embodiments the number of data values may vary depending on the data type, the length in characters of the column names and therefore the linear width of the column data preview panel 422 that is available to display data values, or other factors.

Referring again to FIG. 3, in an embodiment, at block 310 the process 300 is programmed to asynchronously receive input via a graphical user interface, generate updated display instructions as applicable based on the input, and cause re-rendering of different or updated visualizations. In one embodiment, the EDA instructions 150 are programmed to calculate, output, and generate graphical visual displays in a graphical user interface of three (3) data types as indicated by block 312, block 316, and block 320.

Block 312 represents a selection, in the general data overview or EDA dashboard, of an option to focus on columns of the data type VARCHAR or string. In response, at block 314, the EDA instructions are programmed to show a count of columns with null values, counts of columns with distinct values, numbers of columns that contain PII, and data that appears to represent numeric, date-time, or other non-standard data.

Figure 5:
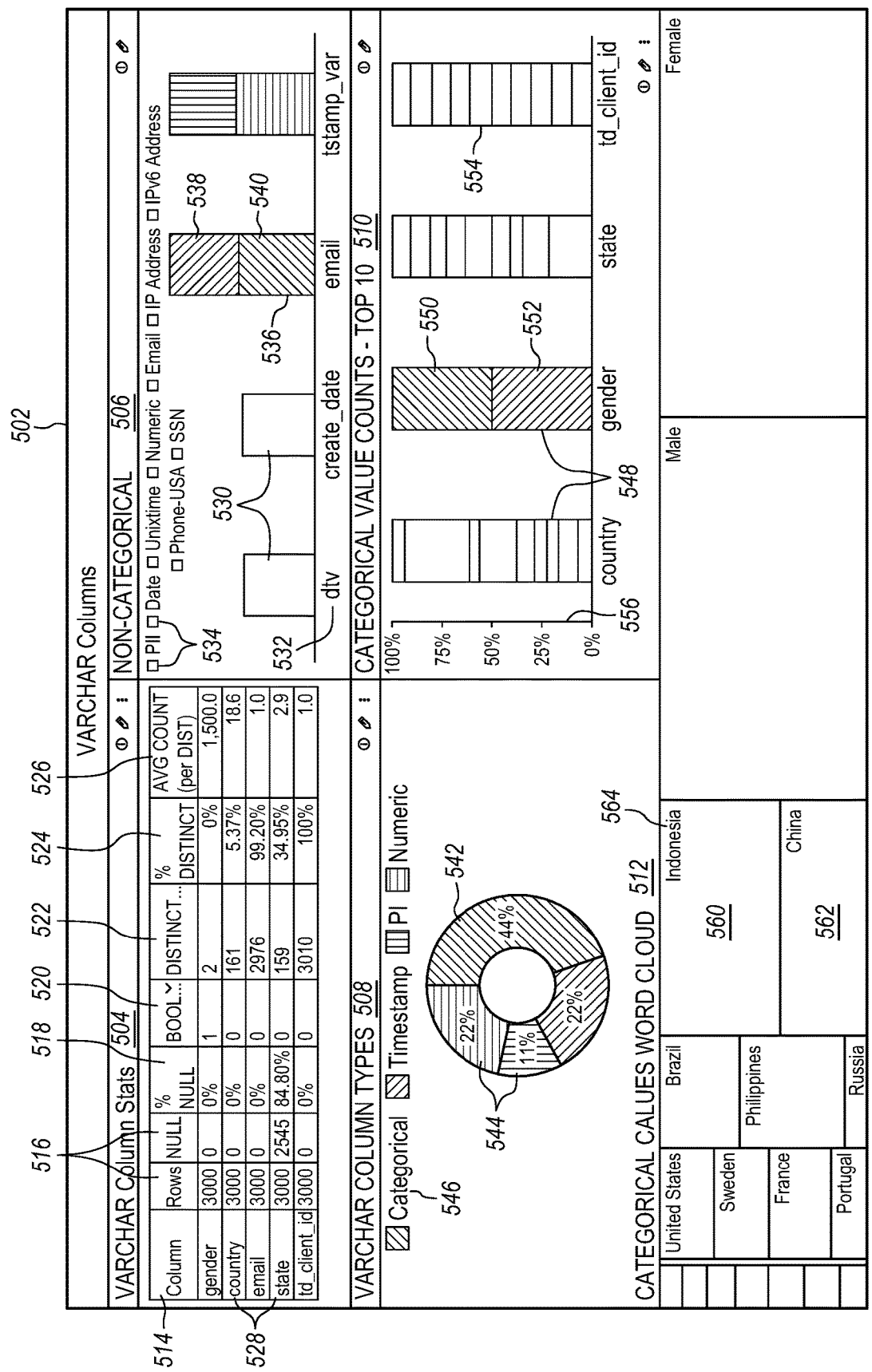
FIG. 5 illustrates an example computer display device with a graphical user interface showing visualizations of metadata for columns of data type VARCHAR.

FIG. 5 illustrates an example computer display device with a graphical user interface showing visualizations of metadata for columns of data type VARCHAR. In an embodiment, the EDA instructions 150 are programmed to cause displaying, on a computer display device, a VARCHAR columns graphical display 502 for statistical values of the table shown in selected table panel 402 (FIG. 4) as shown in FIG. 5. In an embodiment, the VARCHAR columns graphical display 502 comprises a column statistics panel 504, a non-categorical metadata histogram 506, a column types panel 508, a categorical value counts panel 510, and a categorical values word cloud panel 512.

In an embodiment, column statistics panel 504 comprises a table header row 514 having a plurality of statistics column identifiers 516, each of which identifies one of a plurality of different statistical calculations for attributes of columns in the table shown in selected table panel 402 and that EDA instructions 150 are programmed to calculate. The column statistics panel 504 also can have a plurality of rows 528, which correspond to columns of the table shown in selected table panel 402.

In an embodiment, EDA instructions 150 are programmed to calculate, for each column of the table shown in selected table panel 402, and shown as one of the rows 528: a count of total rows in the table, which is "3000" in the example of FIG. 5 as shown in Rows column (one of the identifiers 516); a count of rows containing null values for the specified column, which is "2545" for the column "state" in the example of FIG. 5 as shown in the NULL column (one of the identifiers 516); a percentage of rows that contain null values, as shown in % NULL column 518 of columns statistical panel 504; a count of rows that contain BOOLEAN values, as shown in a BOOLEAN count column 520 of columns statistical panel 504; a count of rows that contain distinctive or different values, as shown in DISTINCT column 522; a percentage of rows that contain distinct values, as shown in % DISTINCT column 524; and an average count as shown in AVG COUNT column 526.

In an embodiment the non-categorical histogram 506 comprises a plurality of graphical histogram bars 530, each of which corresponds to a column of the table in selected table panel 402, as indicated by a column label 532 near an associated graphical histogram bar. The non-categorical histogram 506 can have a plurality of data category labels 534 each comprising a polygon in a colored or otherwise distinctive visual representation, such as a square, and a text label corresponding to that color or distinctive representation. Any of the bars 530, for example bar 536, representing a column having multiple categories of values, can be divided into a plurality of bar segments 538, 540 in a color or otherwise distinctive visual representation that corresponds to one of the data category labels 534. In the example of FIG. 5, the histogram bar 536 representing an "email" column of the table of selected table panel 402 contains PII values and email values, and is rendered using two colors or other distinctive visual representations for segments 538, 540 that correspond to the PII data category label and the email data category label among the data category labels 534.

The term "categorical," for variables in an ML model, refers to columns of VARCHAR or string datatype, which contain multiple values under a specific column category that describe what category a unique user belongs to in the list of possible values in the column. As an example, a "Customer Tier" variable could specify values of "Basic", "Silver", "Gold", "Diamond", each referring to a category; similarly, a "State" column could specify "CT", "NY", "CA" and other allowed values. A VARCHAR column is "Categorical" when that specific column is used in an ML model as a non-numeric predictive feature. Some examples of VARCHAR columns that might not be used as Categorical variables in an ML model are DATE as VARCHAR, user_id as VARCHAR, Firstname, Lastname, and email. These are not in the DATETIME or PII category and are not usually useful as categorical features in training ML models because they are unique to an individual and do not provide contextual information that applies or is relevant to all other users in the population such as State, Customer Tier, Gender, or Highest Level of Education.

In an embodiment the column types panel 508 comprises a column type circle widget 542 comprising a plurality of arc segments 544. Each of the arc segments 544 has a radial arc size that corresponds, proportionally, to the percentage of columns in the table of selected table panel 402 that matches a particular column type, as specified in a plurality of column type labels 546. Each of the arc segments 544 can be generated and displayed using a color or other distinctive representation that corresponds to one column type label among the plurality of column type labels 546 having matching colors or other distinctive representations, and text labels specifying a name of a column type. In the example of FIG. 5, labels can be CATEGORICAL, TIMESTAMP, PII, and NUMERIC. In other embodiments, the number and text for column type labels 546 can vary depending upon the types that are actually represented in columns of a particular table.

In an embodiment, categorical value counts panel 510 comprises a plurality of graphical bars 548 each divided into a plurality of bar segments 550, 552. Each of the bar segments 550, 552 corresponds to a percentage of values in the corresponding column of among the top N values represented overall in the column. In one embodiment, as shown in FIG. 5, N is "10", but other embodiments may use a different value for the top N values. Each of the bar segments 550, 552 may be visually rendered in a color or other distinctive representation to enable visual differentiation of different percentages of values. For example, "gender" bar 548 in the example of FIG. 5 has about 50% of values of one kind and about 50% of values of a second kind and therefore comprises two bar segments 550, 552 of different colors. When a column has values in more than N categories, then only the top N values are represented in the visualization. For example, bar 554 represents a client identifier column in which every row of the underlying table likely has a unique value. Consequently, bar 554 has ten (10) segments corresponding to N=10 and each segment is the same size since a single value in the data corresponds to that segment. N=10 is merely one example and various embodiments may use other values for N, for example, values in the range of "2" to "20" could be used.

In an embodiment the categorical values word cloud panel 512 comprises a plurality of polygons 560, 562, such as rectangles. Each polygon 560, 562 has a label 564 that identifies a data value that is represented in categorical values of all columns of the table of selected table panel 402. Each polygon 560, 562 is rendered in a different size, the size being proportional to the magnitude of representation of the corresponding data value in the column data as a whole.

Referring again to FIG. 3, block 316 represents a selection, in the general data overview or EDA dashboard, of an option to focus on columns of the data type NUMERIC. In response, at block 318, the EDA instructions are programmed to generate statistical summary views including, in various embodiments, counts of columns with null values, a KDE plot, a box plot, MAX, Q1, Q2, AVG, A2, Kurtosis, skewness, outliers, and/or linear correlation.

Figure 6A:
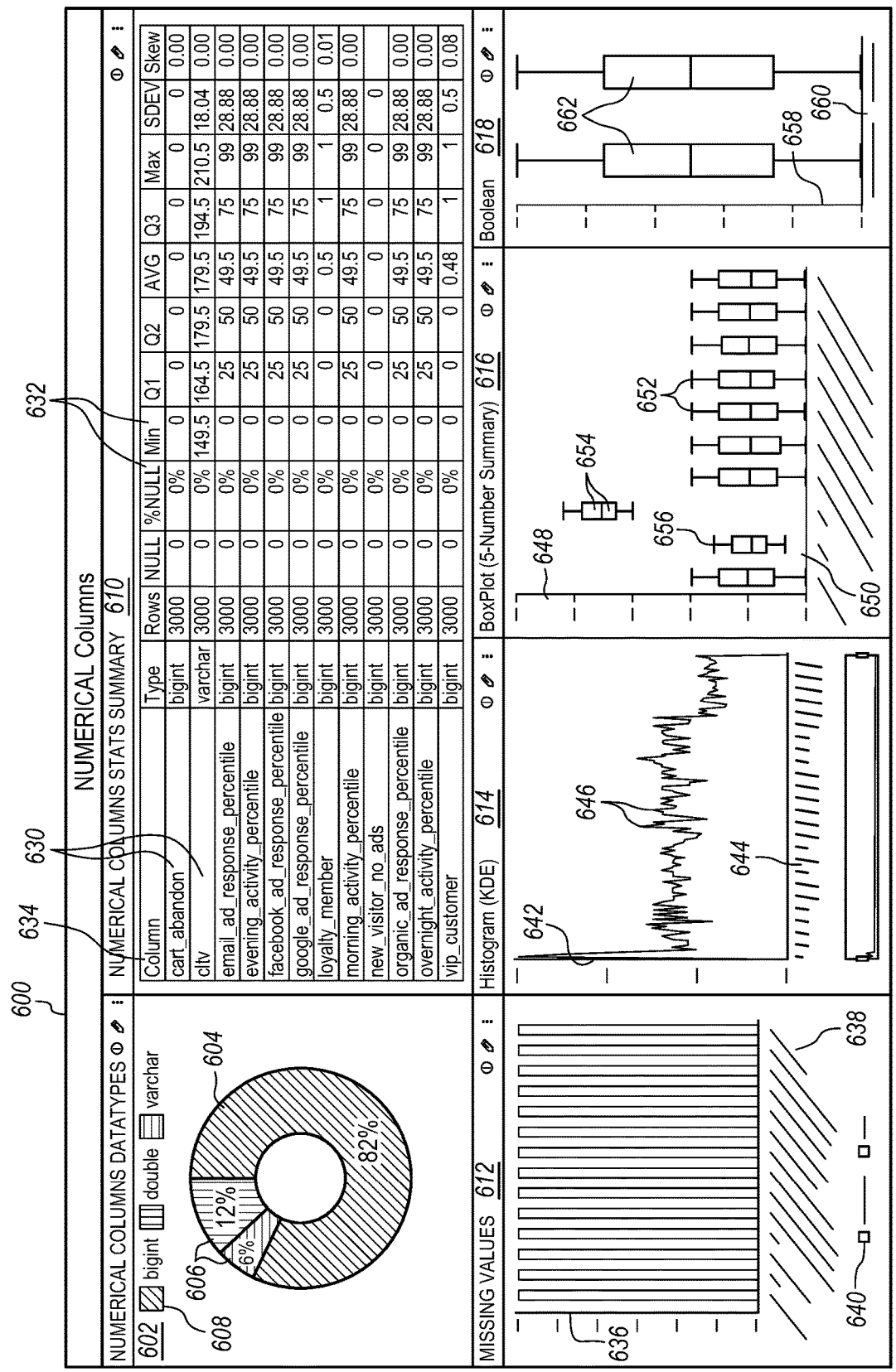
FIG. 6A, FIG. 6B illustrate an example computer display device, each view showing a portion of a graphical user interface showing visualizations of metadata for columns of data type NUMERICAL.
Figure 6B:
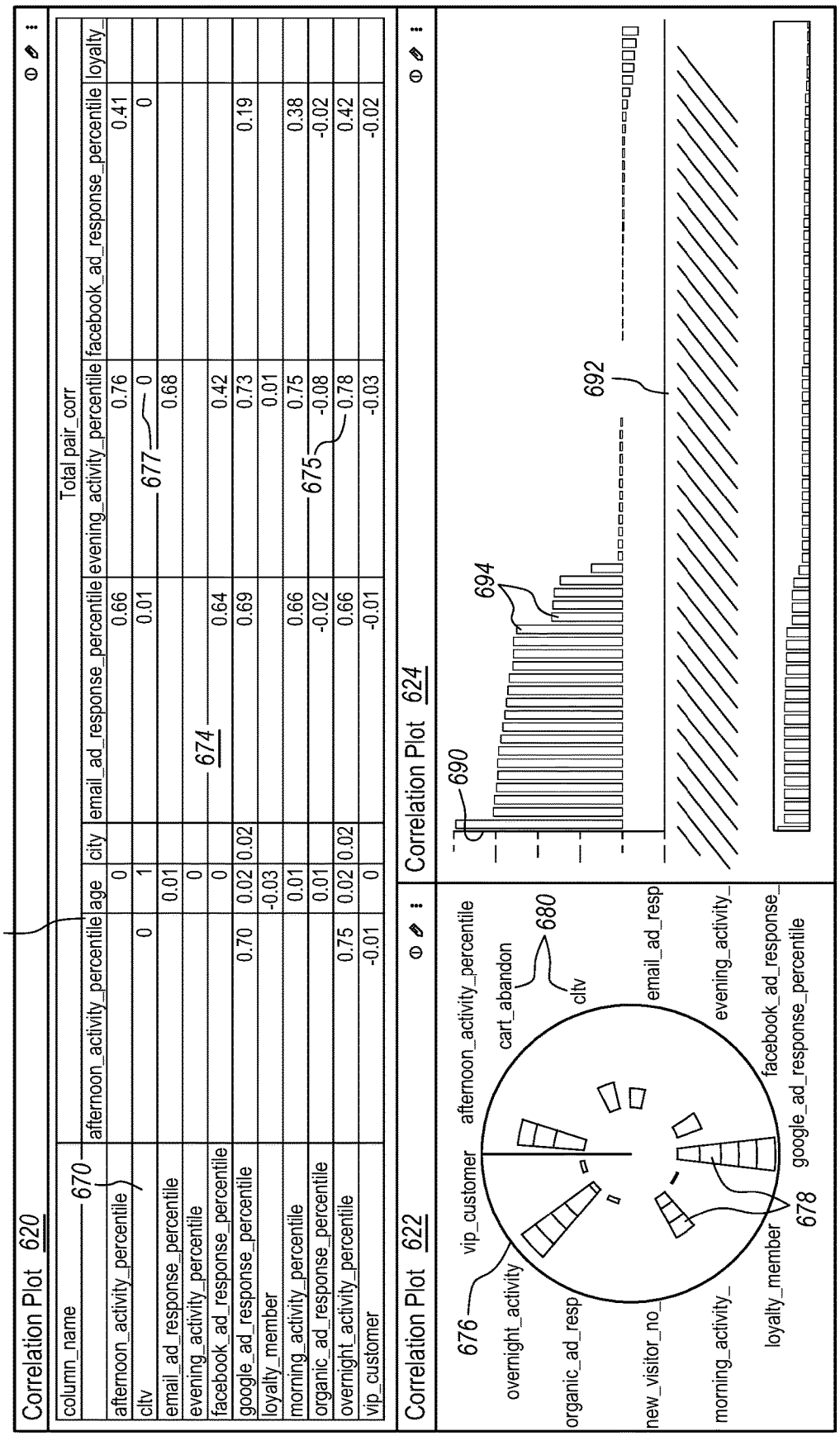

FIG. 6A, FIG. 6B illustrate an example computer display device, each view showing a portion of a graphical user interface showing visualizations of metadata for columns of data type NUMERICAL. Referring first to FIG. 6A, in an embodiment, the EDA instructions 150 are programmed to generate presentation instructions which when rendered using a computer display device cause rendering a graphical user interface 600 having a column data type panel 602, a statistics summary table 610, a missing values panel 612, a histogram 614, a box plot 616, and a Boolean value box plot 618, as seen in FIG. 6A, as well as one or more correlation plots 620, 622, 624, as seen in FIG. 6B and described in other sections herein. In other embodiments, one or more of the foregoing visual elements may be omitted.

In an embodiment, EDA instructions 150 can be programmed to generate and cause displaying the column data type panel 602 with a circle widget 604 having one or more arc segments 606 and data type labels 608. The data type labels 608 can be displayed using different colors or other forms of distinctive visual appearance. The arcuate length of each arc segment 606 can be proportional to a percentage of columns having a corresponding data type, as compared to all columns in the table. To provide a visual cue concerning the proportions, each arc segment 606 can be displayed using a color or other form of distinctive visual appearance that matches a color or other form of distinctive visual appearance of one of the data type labels 608. In the example of FIG. 6A, data type labels 608 indicate that columns of the current table have data types of bigint, double, and varchar, and that the bigint data type is associated with 82% of all columns in the table, varchar data type columns are 12%, and columns with the data type of double are 6% of all columns.

In an embodiment, EDA instructions 150 can be programmed to generate and cause displaying the statistics summary table 610 with a plurality of rows 630, each of the rows corresponding to one of the columns in the table identified in selected table panel 402 (FIG. 4), and with a plurality of columns 632, each of the columns displaying, in cells corresponding to rows, a particular different statistical metric that the EDA instructions have calculated for the corresponding row and column. In an embodiment, a first column 634 of table 610 identifies the name of a column of the underlying table. In an embodiment, a second column of the table 610 identifies a data type of the named column. Other columns 632 of table 610 may specify calculated metrics, such as: count of rows that include the named column; count of rows that have null values for the named column; percentage of rows that have null values for the named column; minimum numeric value in any row for the named column; average, maximum, standard deviation, skew, and similar metrics for the numeric values of rows of the named column. Other embodiments may include more or fewer of the specified metrics, or different metrics.

In an embodiment, EDA instructions 150 can be programmed to generate and cause displaying the missing values panel 612 as a bar graph having a vertical or "Y" axis 636 that specifies a count of rows that are missing values for a specified column, and a horizontal or "X" axis 638 that identifies columns in the table identified in selected table panel 402 (FIG. 4). In the example of FIG. 6A, multiple columns are identified in axis 638 and all are missing values in all rows, so all bars have a magnitude of 3,000 since there are 3,000 rows in the table identified in selected table panel 402. In one embodiment, panel 612 can include labels 640 specifying that the missing values are NULL or non-NULL, each of the labels having a different color or other distinctive visual presentation, and each of the bars in the bar graph can be displayed in a color or other distinctive visual presentation matching one of the labels.

In an embodiment, EDA instructions 150 can be programmed to generate and cause displaying the histogram 614 with a vertical or "Y" axis 642 arranged in a logarithmic scale, for example from "10" to "10,000" units. In an embodiment, EDA instructions 150 can be programmed to generate and cause displaying the histogram 614 with a horizontal or "X" axis 644 that specifies discrete numeric values represented in different columns of the table identified in selected table panel 402. Thus, individual bars 646 of the histogram specify counts of values corresponding to items in the horizontal axis, in any of the columns of the underlying table. In other embodiments, axes 642, 644 may be scaled differently and/or may reflect different units or ranges of units.

In an embodiment, EDA instructions 150 can be programmed to generate and cause displaying the box plot 616 with a vertical or "Y" axis 648 having units corresponding to numeric values represented in any columns of the table identified in selected table panel 402, and a horizontal or "X" axis 650 that specifies names of different columns of the underlying table. Box plot 616 can have a plurality of box items 652, each of the box items visually and graphically illustrating a range of values that are represented in the underlying table for a named column of the underlying table that is aligned with that box item in horizontal axis 650. For example, a column named "age" in the underlying table is visually and graphically represented using box item 656 having ends corresponding to values of about "20" to about "75". EDA instructions 150 can be programmed to calculate each of the box items 652 based on reading rows of the underlying table and accumulating counts of values represented in the columns of the table. In an embodiment, segment 654 represents "cltv" or Customer Lifetime Value and measures total spend by the customer with a particular brand and is typically used to cluster segments of users in "cltv" tier categories to quantify how valuable a user is to the business. In the box plot 616 example, the CLTV value ranges from about 150-200, with an average around 175.

In an embodiment, EDA instructions 150 can be programmed to generate and cause displaying the Boolean value box plot 618 with a vertical or "Y" axis 658 representing values from "0" to "1" and a horizontal or "X" axis 660 that specifies names of columns represented in different columns of the table identified in selected table panel 402. The box plot 618 also can include one or more box items 662 each corresponding to one of the columns that is named in axis 660. When a corresponding column has values other than both "0" and "1", a box item 662 will have endpoints extending from "0" to "1" on the vertical axis 658, as in the example of FIG. 6A. If a corresponding column only has values of "0" or only has values of "1", then a box item 662 can be displayed in a compressed form or omitted.

Referring now to FIG. 6B, in an embodiment, EDA instructions 150 can be programmed to generate and cause displaying one or more correlation plots 620, 622, 624. In an embodiment, correlation plot 620 can be generated and displayed as a table 674 having a plurality of rows 670 each having a plurality of columns 672 and cell values 675, 677. Rows 670 are labeled with names of columns represented in the table identified in selected table panel 402. Each of the columns 672 also is labeled with names of columns represented in the table identified in selected table panel 402. Cell values 675, 677 represent a magnitude of correlation of values in one of the columns matching rows 670 and columns 672. For example, cell value 675 has a magnitude of "0.78" indicating that the column "overnight activitypercentile", as specified in a label of one of the rows 670, stores values that correlate highly to values in the "evening activitypercentile" column which has a label among the columns 672. Similarly, the cell value 677 of "0" indicates that the column "city" of the underlying table has values with no correlation to the "evening activitypercentile" column. In this manner, a data analyst can rapidly see and determine which columns of the underlying table store values have a particular amount of correlation with values in other columns.

EDA instructions 150 can be programmed to generate and cause displaying the correlation plot 622 with a circular widget 676 having a plurality of radially outwardly extending arms 678 each corresponding to columns represented in the table identified in selected table panel 402 and named using labels 680 near corresponding arms. In the example of FIG. 6B, a radial length of each of the arms 678 expresses a magnitude of correlation of the column having a corresponding label 680 to a column of the underlying table that has been selected In the example of FIG. 6B, the circle widget 676, a user computer has transmitted input to select the "age" column, among the columns 672 of plot 620, and the circle widget has radial arms 678 that visually represent magnitudes of correlation to the "age" column. Note that the "age" column is not represented in circle widget 676 because the associated correlation value would be undefined. In some embodiments, each of the arms 678 can be displayed using a plurality of arm segments each having a different color or other distinct visual representation, not to represent particular data but to provide a visual cue concerning a relative magnitude of one arm in comparison to others. Thus, an arm having five segments that are visually represented using different colors or other appearances can be more readily visually distinguished from arms having four segments or six segments.

EDA instructions 150 can be programmed to generate and cause displaying correlation plot 624 with a vertical or "Y" axis 690 having values of "0" to "1" to represent magnitude of correlation with any other column, and a horizontal or "X" axis 692 specifying discrete names of columns represented in the table identified in selected table panel 402. In the example of FIG. 6B, a user computer has transmitted input to select the "age" column, among the columns 672 of plot 620, and the plot 624 comprises a plurality of graphical bars 694 each visually representing a different magnitude of correlation of a column named in the horizontal axis 692 to the "age" column. For example, a first bar of the plot 624 specifies that the "city" column of the underlying table correlates well to the selected "age" column, so the magnitude of that first bar is "1". In an embodiment, bars and column names in axis 692 of plot 624 are ordered from highest, at left, to lowest, and right; this arrangement enables a data analyst to rapidly understand which columns are well correlated to one another. In some cases, as with the first bar and the second bar among the bars 694, and as with the 17th and 18th bars, relatively large changes in correlation magnitude are seen between one bar and another; these "drop offs" could lead to useful interpretations of the data by visually identifying significant changes in correlation of various columns.

Referring again to FIG. 3, block 320 represents a selection, in the general data overview or EDA dashboard, of an option to focus on columns of the data type TIMESTAMP or DATE. In response, at block 322, the EDA instructions 150 are programmed to generate statistical summary views including, in various embodiments, counts of columns with null values, start date values, end date values, time interval values, and/or to plot the top K days with the most activity from each table.

Figure 7:
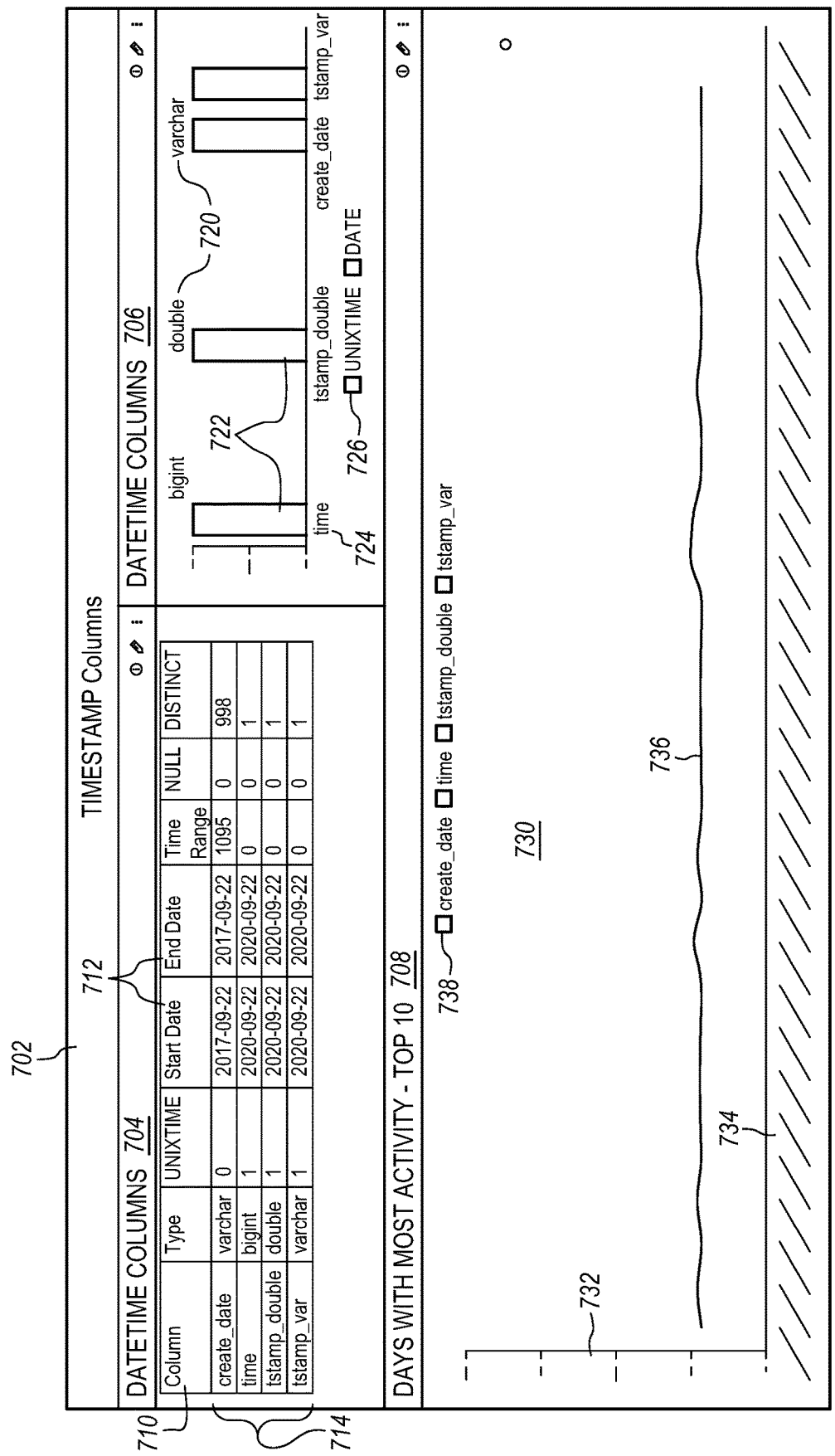
FIG. 7 illustrates an example computer display device with a graphical user interface showing visualizations of metadata for columns of data type TIMESTAMP.

FIG. 7 illustrates an example computer display device with a graphical user interface showing visualizations of metadata for columns of data type TIMESTAMP.

In an embodiment, EDA instructions 150 are programmed to generate instructions which when rendered cause displaying, on a computer display device, a graphical visualization 702 of columns of the table of selected table panel 402 having a data type of date, time, TIMESTAMP, or equivalent. In the example of FIG. 7, the graphical visualization 702 comprises a statistics panel 704, type panel 706, and activity graph panel 708.

In an embodiment, the statistics panel 704 comprises a table header row 710 having a plurality of column labels 712, each of the column labels naming and corresponding to a specific statistical calculation that the EDA instructions 150 are programmed to calculate. Each statistical calculation is executed for the columns of the underlying table that contain date-time data, and those columns are identified in rows 714 by their column name, which appears in the first column label of table header row 710. In the example of FIG. 7, EDA instructions 150 have determined that the columns "create date", "time", "tstamp double" and "tstamp var" contain date-time data as specified by labels of rows 714.

The statistical calculations represented by labels 712 can include a Boolean calculation of whether the column specified in rows 714 contains a UNIXTIME value. The statistical calculations also can specify a start date and end date that were found among values for a corresponding column, a time range in days of the data, a count of columns with null values, and a count of columns having distinct values for a date-time value. For example, panel 704 indicates that a column named "create date" of the table specified in selected table panel 402 (FIG. 4) has a data type of "varchar", is not a UNIXTIME value, has a start date value of Sep. 22, 2017, an end date of Sep. 22, 2017, a time range of "1095", no null values, and "998" distinct values for dates or times.

In an embodiment, type panel 706 is programmed to graphically visualize which columns of the underlying table have specified data types. The type panel 706 can comprise a plurality of data type labels 720 that identify possible data types in which date, time, or TIMESTAMP values could be represented; in the example of FIG. 7, the possible data types are "bigint", "double", and "varchar". Graphical bars 722 correspond to columns of the underlying table, and can have column labels 724 that specify the name of the corresponding columns of the underlying table. In the example of FIG. 7, EDA instructions 150 has identified columns named "time", "tstamp_double", "create_date", and "tstamp_var" as having date-time values. Further, bars 722 indicate that the "time" column has a data type of "bigint", the column "tstamp_double" has a data type of "double," and the columns "create_date" and "tstamp_var" both use the "varchar" data type to represent date-time values. In an embodiment, panel 706 can include format labels 726 corresponding to different encoding formats represented in the data, such as UNIXTIME encoding and DATE encoding. When the underlying data has different encoding in different values, then bars 722 can be visually displayed in different colors or other visual representations that correspond to format labels 726.

In an embodiment, EDA instructions 150 are programmed to generate and display activity graph panel 708 using a graph window 730, a vertical or "Y" axis 732 having a logarithmic scale from one day to 10,000 days, a horizontal or "X" axis 734 representing periods of seven days, a graph line 736, and graph labels 738. In other embodiments, the units of the vertical axis 732 may be different, as FIG. 7 illustrates merely one example. Further, the units of the horizontal axis 734 may be days, period of multiple weeks, months, or other periods. Graph line 736 is calculated and displayed to show the number of rows in the current table that have date values matching values shown in the horizontal axis. In an embodiment, one or more graph lines 736 may be displayed in the graph window 730, each of the lines corresponding to a column having a label shown as one of the graph labels 738.

In some embodiments, one or more of histogram 614 (FIG. 6A) and graph line 736 is rendered as a KDE plot rather than as a true histogram or line graph.

Referring again to FIG. 3, at block 311, the process 300 is programmed to receive one or more selections of filters and to apply filter logic to the visualizations.

Block 330 represents a return or transfer of control from methods, functions, or routines that have executed both block 312 and block 314, or block 316 and block 318, or block 320 and block 322, or block 311. From block 330, the process may be programmed 30 transfer control to block 308 to generate updated display instructions and to cause rendering updated displays or an updated dashboard.

Benefits and Improvements

The embodiments of this disclosure offer numerous benefits and improvements over prior approaches. The techniques of this disclosure are highly scalable as compared to custom scripting or other manual programming techniques. Operation of the workflow is easy to parametrize and customize using different parameters in the configuration file. Embodiments of the dashboard and other GUI elements can be made easily accessible within a larger CDP platform; in this arrangement, there will be no need for a Python environment and running heavy Pandas functions. Embodiments can be used by data engineers to verify successful ingestion and validity of data. Embodiments can be programmed to execute automatic detection of PII columns and can be programmed to identify columns of data type DOUBLE and BIGINT even for columns that were written to storage with the VARCHAR data type at the time of data ingestion. These features can allow data engineers to quickly determine which columns need to be converted back to NUMERICAL values for production use.

6. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
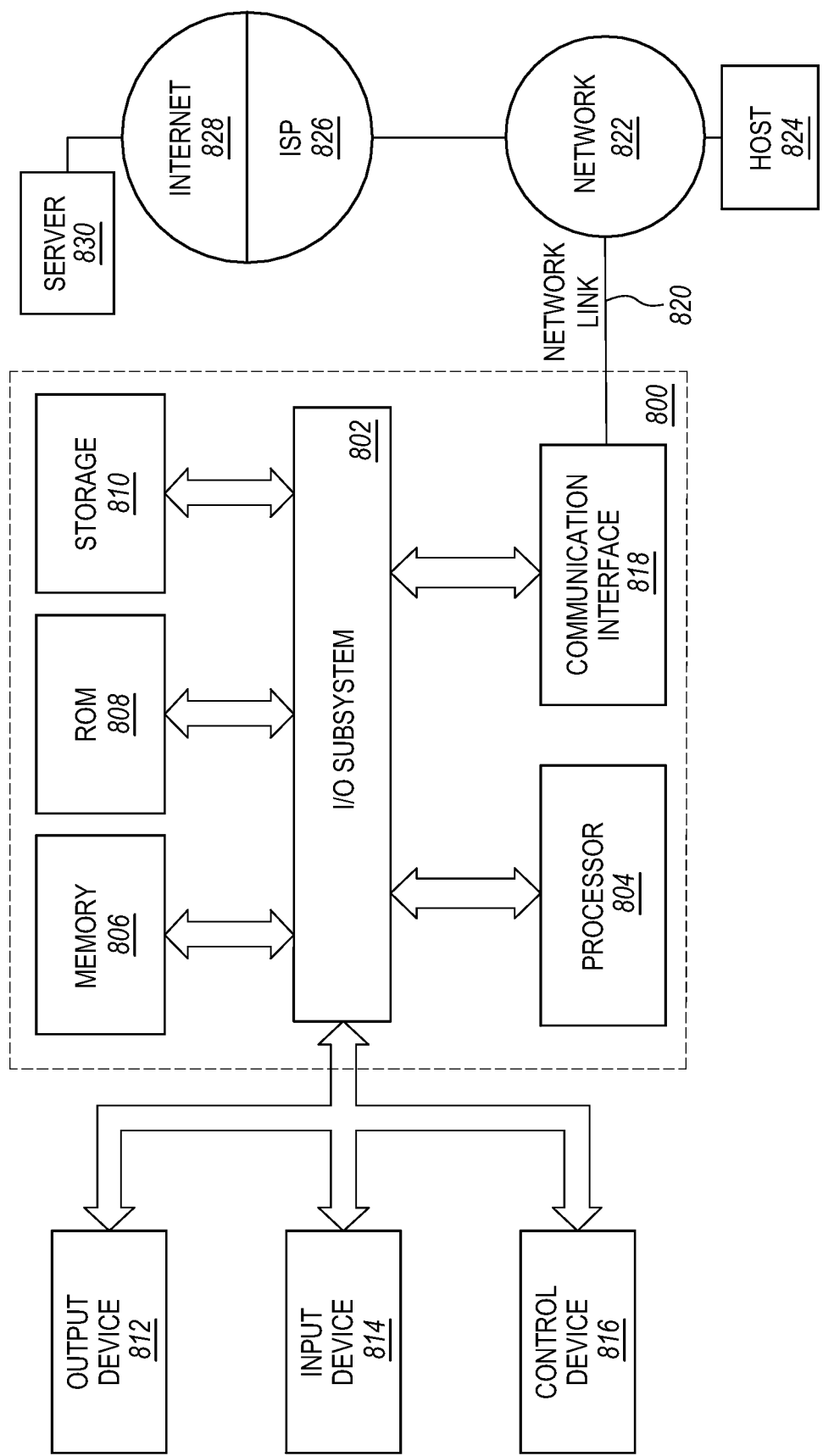
FIG. 8 illustrates a computer system with which one embodiment could be implemented.

FIG. 8 illustrates a computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and one or more sequences of instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of one or more non-transitory computer-readable storage media that may be used to store one or more sequences of instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using SQL or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on an output device 812 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host computer 824 or server computer 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Example forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to I/O subsystem 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server computer 830 broadly represents any computer, data center, virtual machine or virtual computing instance with or without a hypervisor, or computer executing a containerized program system such as DOCKER or KUBERNETES. Server computer 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server computer 830 may form elements of a distributed computing system that includes other computers, a processing cluster, server farm or other organization of computers that cooperate to perform tasks or execute applications or services. Server computer 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server computer 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
   using a first computer, reading a configuration file to iteratively access databases, tables and columns specified in the configuration file;
   using the first computer programmatically calling PRESTO and HIVE functions to execute aggregation operations on the databases, the tables and the columns while concurrently calculating aggregated statistical metadata relating to the databases, the tables and the columns;
   in response to executing the aggregation operations and calculating the aggregated statistical metadata, creating and storing reduced-size tables comprising a metadata table, wherein display instructions are generated to display an exploratory data analysis (EDA) dashboard corresponding to the reduced-size tables with the metadata table on a graphical user interface (GUI) of a computer display device associated with the first computer;
   using the first computer, receiving input specifying a plurality of filters to remove non-matching rows of the metadata table from visualization of the EDA dashboard; and
   generating one or more GUI panels, each GUI panel is associated with a particular type of filter.

2. The computer-implemented method of claim 1, wherein the input specifying the plurality of filters comprises a plurality of data type flags and personally identifiable information (PII) detection flags.

3. The computer-implemented method of claim 1, wherein the one or more GUI panels are arranged in a hierarchical or cascading chain of the plurality of filters.

4. The computer-implemented method of claim 1, further comprising creating and storing column metadata, column statistics for the columns of any of a data type NUMERIC, a data type TIMESTAMP or DATE, a histogram for the columns of the data type NUMERIC and a correlation matrix for the columns of the data type NUMERIC.

5. The computer-implemented method of claim 1, wherein the input specifying the plurality of filters comprises a selection of any of data type VARCHAR, data type NUMERIC, data type TIMESTAMP or DATE.

6. The computer-implemented method of claim 5, further comprising:
   in response to receiving the selection of the data type VARCHAR, outputting statistical summary views of a count of columns with null values, counts of columns with distinct values, numbers of columns that contain PII on the EDA dashboard.

7. The computer-implemented method of claim 5, further comprising:
   in response to receiving the selection of the data type NUMERIC, outputting statistical summary views of counts of columns with null values, a KDE plot, a box plot, MAX, Q1, Q2, AVG, A2, Kurtosis, outliers, and linear correlation on the EDA dashboard.

8. The computer-implemented method of claim 5, further comprising:
   in response to receiving the selection of the data type TIMESTAMP or DATE, outputting statistical summary views of counts of columns with null values, start date values, end date values, time interval values, and plot of top number of days with most activity from each table.

9. One or more non-transitory computer-readable storage media storing one or more sequences of program instructions which, when executed using one or more processors, cause the one or more processors to execute:
   using a first computer, reading a configuration file to iteratively access databases, tables and columns specified in the configuration file;
   using the first computer programmatically calling PRESTO and HIVE functions to execute aggregation operations on the databases, the tables and the columns while concurrently calculating aggregated statistical metadata relating to the databases, the tables and the columns;
   in response to executing the aggregation operations and calculating the aggregated statistical metadata, creating and storing reduced-size tables comprising a metadata table, wherein display instructions are generated to display an exploratory data analysis (EDA) dashboard corresponding to the reduced-size tables with the metadata table on a graphical user interface (GUI) of a computer display device associated with the first computer;
   using the first computer, receiving input specifying a plurality of filters to remove non-matching rows of the metadata table from visualization of the EDA dashboard; and
   generating one or more GUI panels, each GUI panel is associated with a particular type of filter.

10. The one or more non-transitory computer-readable storage media of claim 9, wherein the input specifying the plurality of filters comprises a plurality of data type flags and personally identifiable information (PII) detection flags.

11. The one or more non-transitory computer-readable storage media of claim 9, wherein the one or more GUI panels are arranged in a hierarchical or cascading chain of the plurality of filters.

12. The one or more non-transitory computer-readable storage media of claim 9, further comprising sequences of program instructions which, when executed using the one or more processors, cause the one or more processors to execute, creating and storing column metadata, column statistics for the columns of any of a data type NUMERIC, a data type TIMESTAMP or DATE, a histogram for the columns of the data type NUMERIC and a correlation matrix for the columns of the data type NUMERIC.

13. The one or more non-transitory computer-readable storage media of claim 9, wherein the input specifying the plurality of filters comprises a selection of any of data type VARCHAR, data type NUMERIC, data type TIMESTAMP or DATE.

14. The one or more non-transitory computer-readable storage media of claim 13, further comprising sequences of program instructions which, when executed using the one or more processors, cause the one or more processors to execute, in response to receiving the selection of the data type VARCHAR, outputting statistical summary views of a count of columns with null values, counts of columns with distinct values, numbers of columns that contain PII on the EDA dashboard.

15. The one or more non-transitory computer-readable storage media of claim 13, further comprising sequences of program instructions which, when executed using the one or more processors, cause the one or more processors to execute, in response to receiving the selection of the data type NUMERIC, outputting statistical summary views of counts of columns with null values, a KDE plot, a box plot, MAX, Q1, Q2, AVG, A2, Kurtosis, outliers, and linear correlation on the EDA dashboard.

16. The one or more non-transitory computer-readable storage media of claim 13, further comprising sequences of program instructions which, when executed using the one or more processors, cause the one or more processors to execute, in response to receiving the selection of the data type TIMESTAMP or DATE, outputting statistical summary views of counts of columns with null values, start date values, end date values, time interval values, and plot of top number of days with most activity from each table.

* * * * *